United States Patent Office.

ISAAC L. PLUMER, OF CHELSEA, ASSIGNOR TO J. S. CHASE, OF HARWICH, MASSACHUSETTS.

Letters Patent No. 106,617, dated August 23, 1870.

IMPROVEMENT IN MATERIAL FOR PASTE FOR BOOKBINDERS AND OTHERS.

The Schedule referred to in these Letters Patent and making part of the same.

*To all whom it may concern:*

Be it known that I, ISAAC L. PLUMER, of Chelsea, in the county of Suffolk and State of Massachusetts, have invented a Powder for Making Paste, of which the following is a full, clear, and exact description.

Flour paste, commonly used by book-binders, boot and shoe manufacturers, paper-hangers, bill-posters, and others, is prepared by boiling the flour in water until of the right consistency, when it is put up in cans or other convenient packages and sold to the consumer as an article of commerce.

It is, however, impossible, to preserve this paste in its original fresh condition any great length of time, and, owing to the water contained in the paste, its bulk, weight, and cost of transportation are necessarily increased.

To remedy the above-mentioned objections is the purpose of my invention, which consists in converting flour into a dry, gummy, or glutinous substance, capable of, or being reduced to a fine or impalpable powder, so compounded and prepared as to simply require mixing in cold or warm water to form the paste in the determinate quantity desired for use, the dry property of the powder causing it to occupy much less space than the same amount of flour when mixed with water, whereby the cost of transportation is materially reduced, and the souring and consequent waste incident to flour paste, as commonly prepared, is avoided.

To enable others skilled in the art to understand and use my invention, I will proceed to describe the manner in which I have carried it out.

One barrel of wheat-flour and one pint of a saturated aqueous solution of alum are mixed with just sufficient water to knead or work easily into dough, which is then cut into lumps or balls of convenient size, weighing from two to three pounds. Each lump or ball is now inclosed within a cloth bag, tin vessel, or other suitable receptacle, to prevent waste, when placed in a boiler to be subjected to the boiling process, which continues until thoroughly cooked, and usually occupies about two hours.

The balls or lumps are now removed from the boiler, and taken out of the bags or other receptacles, and are then cut into thin slices, and thoroughly dried by exposure to natural or artificial heat. The dried slices are next ground or pulverized (in any well-known manner) to a fine or impalpable powder, which is put into packages of various sizes, for transportation.

When the consumer wishes to convert the powder into a paste, small quantities of the powder are gradually stirred in a suitable vessel, containing cold or warm water, until the exact quantity of paste required, of the right consistency, is made.

By thus mixing the powder in the exact quantity, and at the time it is required to use a paste, instead of having a flour paste previously mixed and contained in a package, the size of which is oftentimes larger than that required for immediate use, no paste remains to sour or deteriorate and waste, which objections are incident to the employment of the ordinary flour-paste.

Rye, or other flour suitable for making flour-paste, may be used instead of wheat-flour, if desired, and the powder may be prepared without alum, but I prefer to use it, as it tends to expand and thicken and make porous the paste, while it also improves its adhesive properties and color.

It will be seen, from the foregoing description, that my invention possesses the following advantages over the flour-paste, as heretofore mixed, put up, and employed, viz., of being light, compact, and, therefore, comparatively inexpensive to transport, and, as it is only used in quantities just sufficient for immediate requirements, it has no time to become sour, or otherwise deteriorate.

I may, if advisable, put up the dry slices in packages ready for transportation, instead of first converting the slices to powder, without departing from the spirit of my invention; but I prefer to furnish the powder, as it is then more readily made into paste.

Claims.

What I claim as my invention, and desire to secure by Letters Patent as a new article of manufacture, is—

A dry, gummy, or glutinous substance, substantially as described, produced from flour, and capable of, or being reduced to a fine or impalpable powder for making paste, substantially as set forth.

Also, the process of treating flour, substantially as herein described, for the purpose set forth.

Witness my hand this 22d day of July, 1870.

ISAAC L. PLUMER.

Witnesses:
N. W. STEARNS,
W. J. CAMBRIDGE.